United States Patent [19]

Steiger

[11] 4,059,077
[45] Nov. 22, 1977

[54] RECIPROCATING INTERNAL COMBUSTION ENGINE FOR OPERATION WITH FUEL IN POWDER FORM

[75] Inventor: Anton Steiger, Illnau, Switzerland

[73] Assignee: Sulzer Brothers Limited, Winterthur, Switzerland

[21] Appl. No.: 714,812

[22] Filed: Aug. 16, 1976

[30] Foreign Application Priority Data

Apr. 7, 1976 Switzerland .................... 4355/76

[51] Int. Cl.² ............................................. F02B 45/00
[52] U.S. Cl. ...................................... 123/23; 222/194
[58] Field of Search ................ 123/23; 110/28 R; 60/39.46; 222/194, 365, 373

[56] References Cited

U.S. PATENT DOCUMENTS

| 1,656,678 | 1/1928 | Pawlihowshi | 123/23 |
| 1,719,023 | 7/1929 | Pawlihowshi | 123/23 |
| 1,897,478 | 2/1933 | Holzwarth | 123/23 |

FOREIGN PATENT DOCUMENTS

| 110,174 | 5/1925 | Switzerland | 123/23 |
| 450,727 | 7/1936 | United Kingdom | 123/23 |
| 809,844 | 3/1959 | United Kingdom | 60/39.46 |

Primary Examiner—Ronald H. Lazarus
Assistant Examiner—David D. Reynolds
Attorney, Agent, or Firm—Kenyon & Kenyon, Reilly, Carr & Chapin

[57] ABSTRACT

The valve piston is charged with powdered fuel, such as coal, which is initially metered into a fuel transfer channel during a downward stroke of a dosing and ejecting member and then blown via compressed air through the valve piston into the combustion chamber upon completion of the downward stroke of the dosing and ejecting member. A slider is used to allow metering of the fuel without interference from the compressed air. After the fuel charge is metered, the slider moves transversely of the transfer channel to permit entry of the compressed air so that the charge can be blown into the combustion chamber via the valve piston.

14 Claims, 10 Drawing Figures

RECIPROCATING INTERNAL COMBUSTION ENGINE FOR OPERATION WITH FUEL IN POWDER FORM

This invention relates to a reciprocating internal combustion engine for operation with fuel in powder form. More particularly, this invention relates to an apparatus for charging powdered fuel into a cylinder of an internal combustion engine.

Heretofore, it has been known to operate a reciprocating internal-combustion engine with fuel in powder form, particularly powdered coal. For example, it has been known to supply a suspension of powdered coal and air to the combustion chamber of reciprocating internal-combustion engines via two coaxially disposed valves of an antechamber. The mixture has then been ignited and burned in the antechamber with the aid of oil. However, it is usually disadvantageous to suspend the powdered coal in air preparatory to combustion because uniform distribution of the powder cannot be assured during travel from the location where the suspension is formed to the antechamber. For this reason, the dosing of a defined quantity of powdered coal is difficult. Thus, the engine may well be charged differently in each working cycle of operation with the result that the engine delivers varying power.

The use of valves, which is generally preferred in some circumstances, is also disadvantageous in the known engines because no real tightness of the valve seats is obtainable after a protracted operating period. This is because the powder particles cannot be prevented from adhering to the seating surfaces when the coal/air suspension flows through the valves. Further, the known engine has the further disadvantage that separate devices and energy must be provided to form the suspension to be compressed to compression pressure, thus increasing the cost of the engine and the cost of operation substantially.

It has also been known to be difficult to transport fuel in powder form through a channel into a combustion chamber of the reciprocating engine cylinder by mechanical trasporting means. Powdered coal, in particular, may tend to bake together or lump and, thus, may cause clogging of the channel. Therefore, the advantages inherent in a mechanical transport, such as exact dosability, generally possible with quite a number of bulk materials in powder form, can be utilized only with difficulty to operate a reciprocating internal-combustion engine with powdered fuel.

Accordingly, it is an object of the invention to improve an internal-combustion engine which uses powdered fuel so that the amount of fuel to be supplied per working cycle, and hence the power delivered, can be controlled reliably without the danger of clogging.

It is another object of the invention to provide a simple means of charging an internal combustion engine with powdered fuel.

It is another object of the invention to charge an internal combustion engine with precise charges of powdered fuel.

It is another object of the invention to avoid clogging of the valve pistons of an internal combustion engine supplied with powdered fuel.

Briefly, the invention is directed to a reciprocating internal combustion engine which includes an engine cylinder head having at least one combustion chamber, a piston movably mounted in the combustion chamber and a valve piston which is slidably mounted in the cylinder head and has outlets for expelling fuel into the combustion chamber. The invention provides such an engine with a housing in which a fuel collecting chamber and fuel transfer channel are formed as well as a closing member disposed intermediately of the transfer channel. In addition, a dosing and ejecting member is provided in the housing along with an adjusting means for adjusting the position of the dosing and ejecting member and a control means for cyclically moving the dosing and ejecting member, closing member and valve piston in timed sequence to eject a charge of fuel into the engine combustion chamber.

The fuel transfer channel communicates the fuel collecting chamber with the valve piston in order to deliver the powdered fuel into the valve piston and is divided into upper and lower portions by the closing member.

The closing member includes a slider block which is movable transversely of the transfer channel and has a passage for selective alignment with the transfer channel. In addition, the member has a recess for selective alignment with the fuel transfer channel, a piston which is movably mounted in the recess and a spring means for biasing the piston out of the recess towards the fuel collecting chamber. In one position, with the piston and recess aligned with the transfer channel, a charge of fuel can be measured out by the dosing and ejecting member while in a second position, with the slider block passage aligned with the transfer channel, the measured fuel charge can be passed into the valve piston.

The dosing and ejecting member is aligned with the transfer channel for expelling a measured charge of fuel from the collecting chamber through the transfer channel and the slider block passage into the valve piston. The position of the member may be adjusted relative to the piston of the closing member so as to vary the charge of fuel.

While it is possible by means of the invention to transport the fuel to the collecting chamber in the form of a suspension, there is no dosing yet on this path in the working cycle of the engine. That is, the fuel is ejected from the collecting chamber into the channel leading to the combustion chamber without any compression whatever. Accordingly, there is no danger at all of lumping or of clogging of the fuel line.

These and other objects and advantages of the invention will become more apparent from the following detailed description and appended claims taken in conjunction with the accompanying drawings in which:

Figure 1:
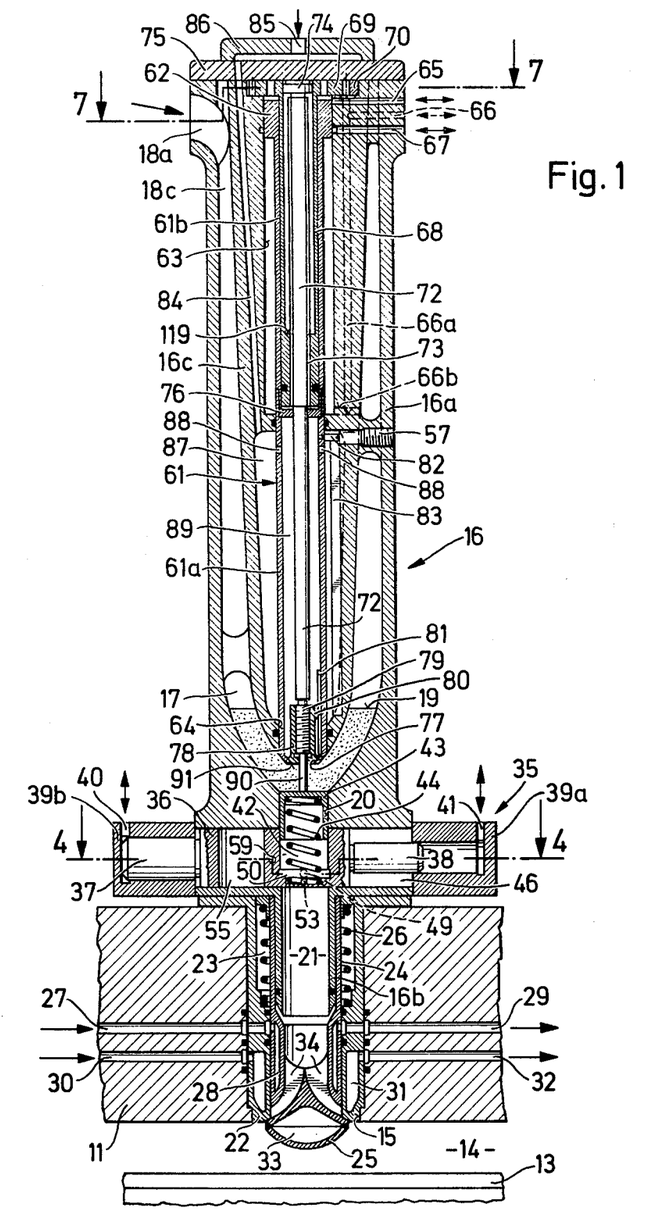
FIG. 1 illustrates a partial sectional view of a reciprocating internal-combustion engine according to the invention showing a cylinder with an apparatus for charging powdered fuel into the cylinder mounted on a cylinder head.

Referring to FIG. 1, the reciprocating internal combustion engine has, as is known, a cylinder head 11 in which at least one cylinder is formed and which has a liner (not shown) in the cylinder along with a movably mounted piston 13 to define a combustion chamber 14. The piston 13 drives a crank shaft (not shown) in known manner.

In order to charge a fuel such as a powdered fuel into the combustion chamber 14, a charging apparatus is mounted on the cylinder head 11 and a valve piston 25 is mounted in the head 11 to move into and out of the combustion chamber 14. To this end, the valve piston 25 is formed with outlets for expelling fuel into the combustion chamber 14.

Figure 7:
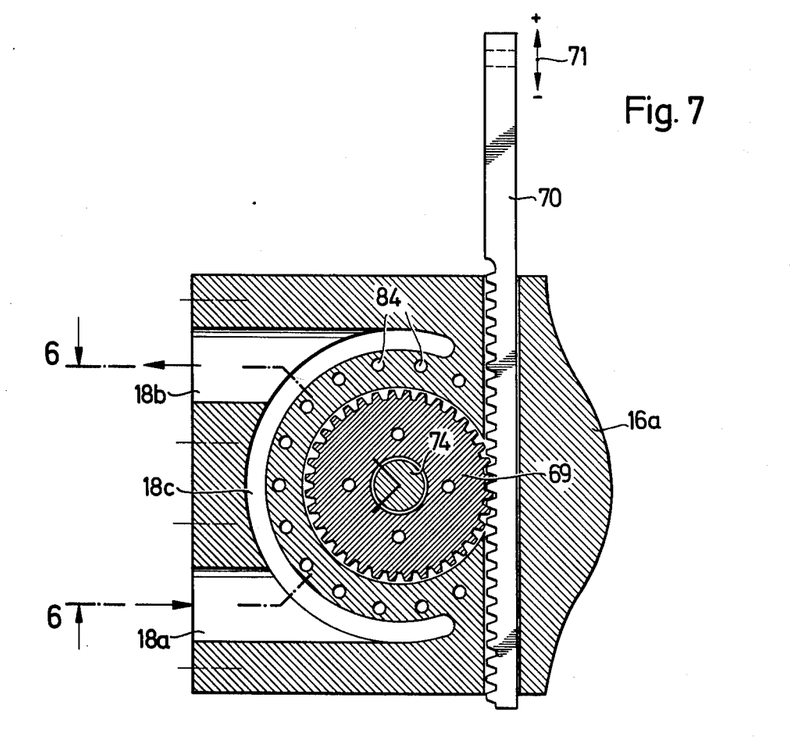
FIG. 7 illustrates a view taken on line 7—7 of FIG. 6.

The charging apparatus includes a housing 16 formed of an upper part 16a and lower part 16b which lower part 16b is fitted into a bore in the cylinder head 11. The upper part 16a has a fuel collecting chamber 17 for the powdered fuel which can be introduced into the collecting chamber through an inlet opening 18a in the form of a suspension in a carrier gas. As shown in FIG. 7, the collecting chamber 17 is of semi-circular shape at the upper end with a part 18c adjoining the inlet opening 18a so that the fuel, preferably powdered coal, is separated from the carrier gas and drops into the shaft-like lower part to form a fuel level 19; the carrier gas escaping through an opening 18b.

Near the lower end of the collecting chamber 17, the housing part 16a has a cylindrical bore 20 which forms the first portion of a transfer channel through which the fuel can pass from the collecting chamber 17 into the combustion chamber 14. Another portion 21 of the transfer channel is formed by the lower housing part 16b. As shown, the housing part 16b is enclosed by an insert 22 which is located in a bore 15 of the cylinder head 11 in spaced relation to the housing part 16b to define a space 23. A sleeve-like extension 24 of the valve piston 25 is disposed in this space to shut off the combustion chamber 14 from the transfer channel 21. The sleeve-like extension 24 of the valve piston 25 slides with little clearance on the outside surface of the housing part 16b. In the position shown in FIG. 1, the valve piston 25 is pushed against a seating surface in the insert 22 by means of a spring 26 in the space 23.

Figure 3:
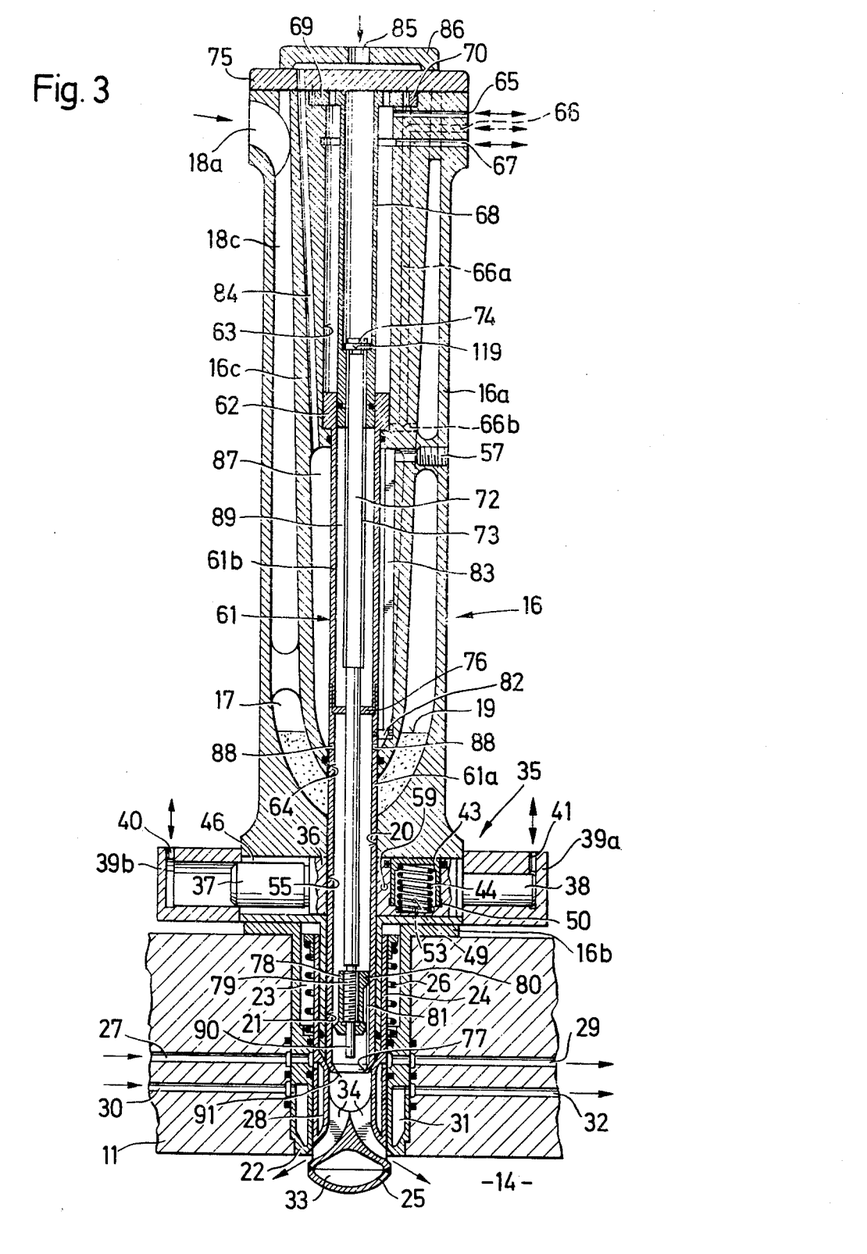
FIG. 3 illustrates a view corresponding to FIG. 1 with the dosing and ejecting member in a lower end position in accordance with the invention.
Figure 3A:
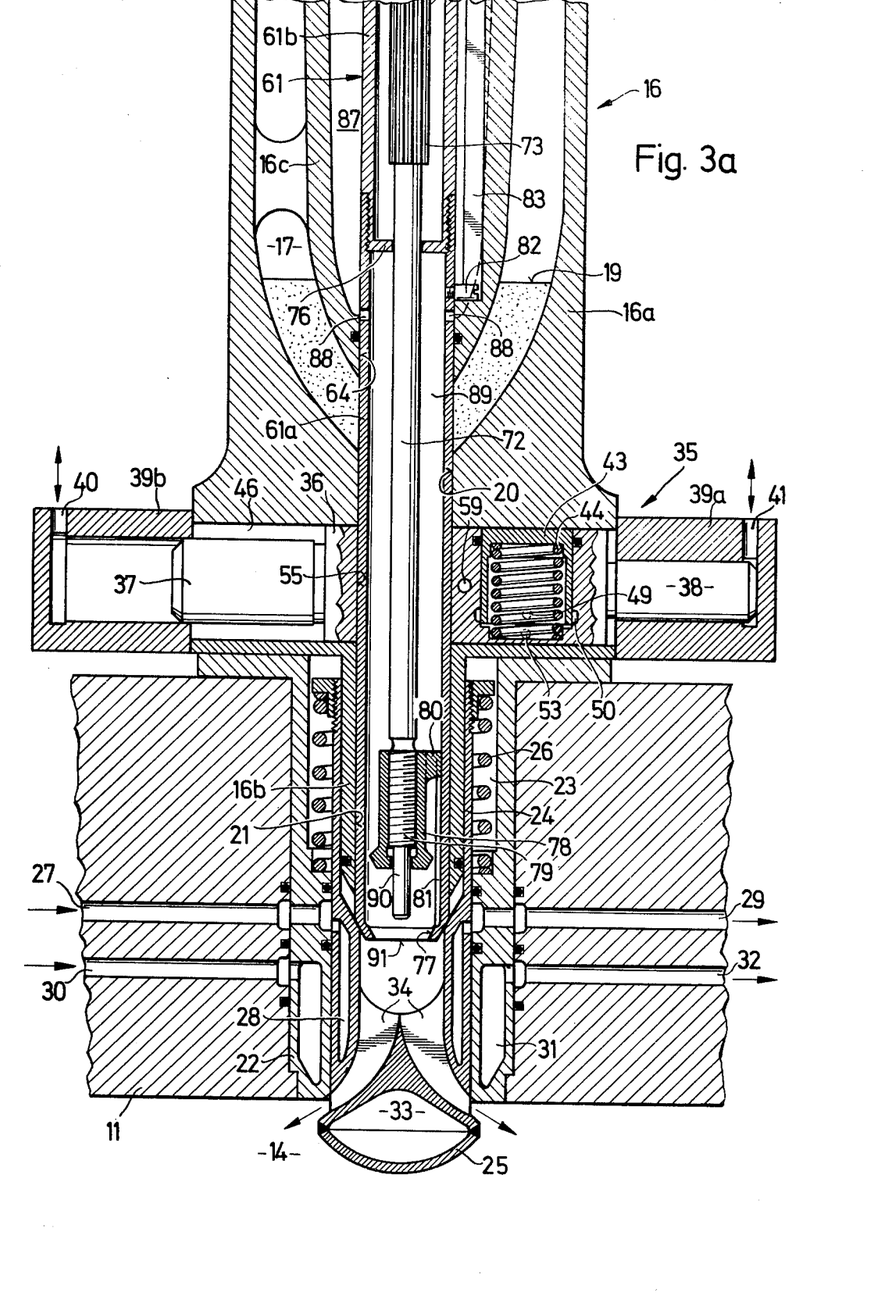
FIG. 3a illustrates a detail of FIG. 3 in larger scale.

Referring to FIGS. 1 and 3a, the valve piston 25 includes a chamber 28 to which coolant can be supplied via a bore 27 and discharge via another bore 29. Similarly, the insert 22 can be formed with a chamber 21 into which coolant can be supplied via a bore 30 and discharged via a bore 52. The cooling chamber 28 serves to cool the valve piston 25 whose lower part, directed towards the combustion chamber 14, contains an insulating cavity 33. Ribs 34 may also be formed in the piston 25 so that heat can be conducted from the valve piston head to the area of the cooling chamber 28. The cooling chamber 31 serves to cool the seating portion for the valve body 25.

Figure 4:
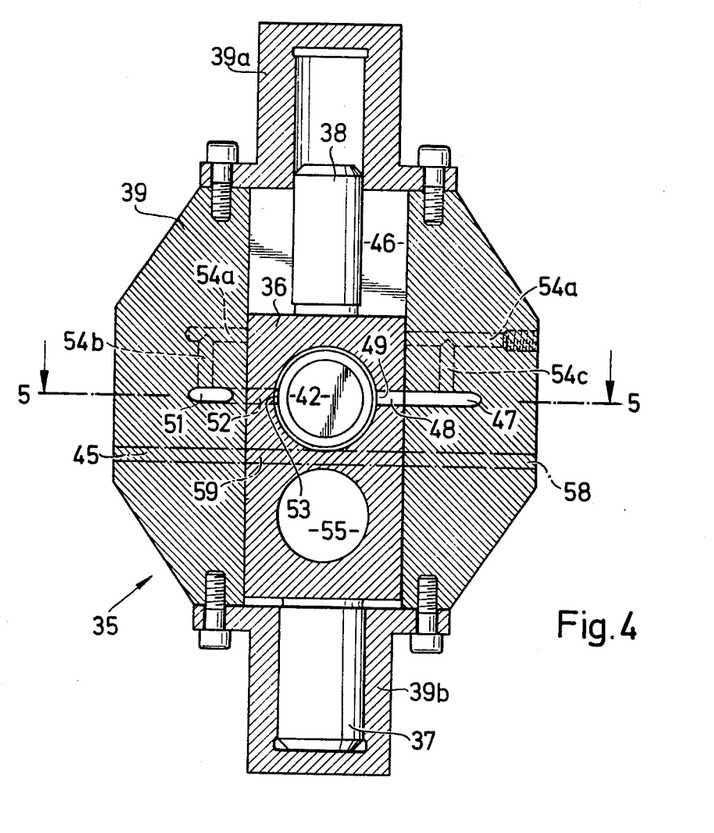
FIG. 4 illustrates a view taken on line 4—4 of FIG. 1.

A closing member 35 is located between the lower part 16b and the upper part 16a of the housing between the portions 20, 21 of the transfer channel and includes a slider block 36 to which is attached two pistons 37 and 38, respectively. The pistons 37, 38 are movably guided in cylinders formed by parts 39a and 39b of the closing member 35 (FIG. 4). These latter parts 39a, 39b have ports 40, 41 which connect to pressure medium lines of an hydraulic control means which will be described later. The active area of the piston 37 is greater than that of the piston 38. A cylindrical recess 42 is formed in the slier block 36 and receives a piston 43 which is acted upon by a spring 44 supported by the base of the cylindrical recess 42. As shown in FIG. 1, the recess 42 and piston 43 are aligned with the channel 20, 21.

Referring to FIG. 4, the closing member part 39 has a pressure medium bore 45 which extends into a chamber 46 which accommodates the slider block 36. This bore 45 communicates with an opposite bore 58 in the part 39 via a bore 59 in the slider block 36. A pressure medium bore 47 also extends obliquely downwards in the part 39 and can communicate with a bore 48 in the slider block 36 when the slider block 36 is in the position shown in FIG. 4. The bore 48 ends in an annular chamber formed by a slot 50 via an aperture 49.

Figure 2:
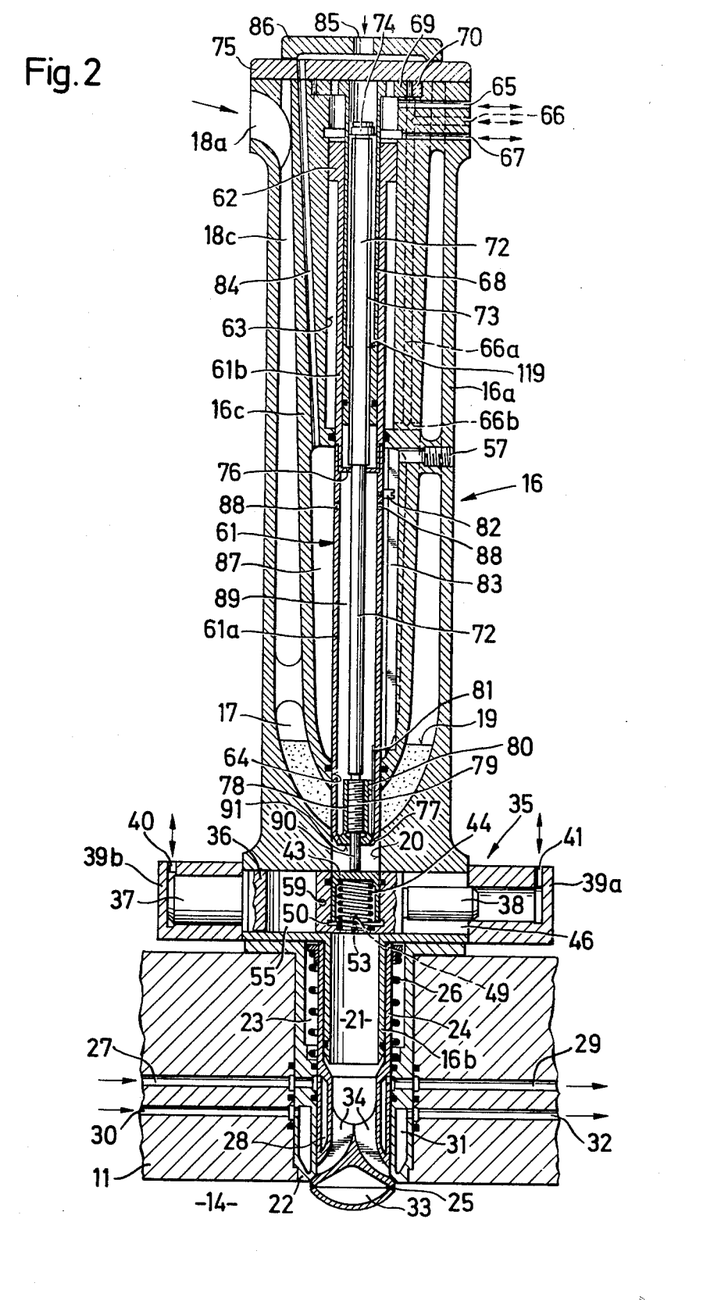
FIG. 2. illustrates a corresponding view of the charging apparatus with a dosing and ejecting member in an intermediate position in accordance with the invention.
Figure 5:
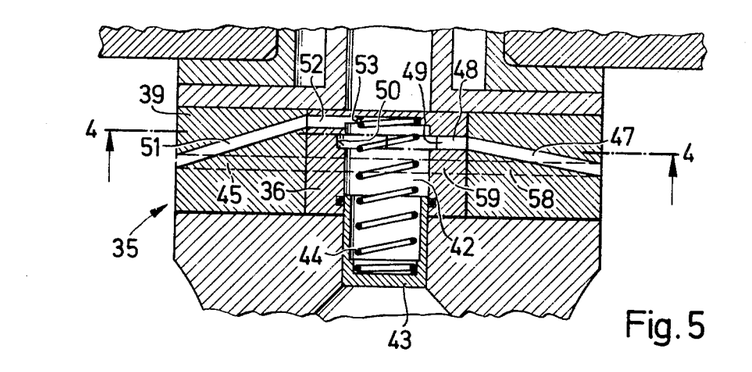
FIG. 5 illustrates a view taken on line 5—5 of FIG. 4.
Figure 6:
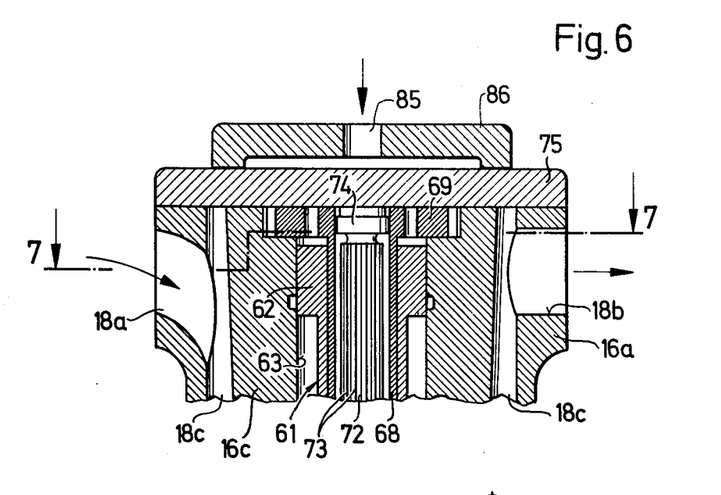
FIG. 6 illustrates a view taken on line 6—6 of FIG. 7.

Located on the other side of the part 39 is an obliquely ascending pressure medium bore 51 (FIG. 5) which, in the position shown, communicates with a bore 52 in the slider block 36 and terminates via an aperture 53 in the cylindrical chamber 42 and, more specifically, below the aperture 49. Therefore, in the position of the piston 43 as shown in FIGS. 1 and 5, there is a connection between bores 47 and 51. If the piston 43 is completely sunk into the slider block 36 as is the case for the operating states per FIGS. 2 and 3, the piston 43 closes the aperture 49, thereby interrupting a direct connection between the bores 47 and 51. The bores 47 and 51 can be connected with each other via bores 54a, 54b and 54c when the bore 59 in the block 36 is aligned with them in another end position of the slider block 36. The slider block 36 also has a passage 55 which is in line with the axis of the transfer channel 20, 21 in the position according to FIG. 3.

Referring to FIG. 1, a tubular dosing and ejecting member 61 is movably disposed in the upper housing part 16b and consists of two parts 61a and 61b. the upper end of one part 61b supports a piston 62 which can move along a cylindrical housing wall 63. The lower part 61a is guided in a bore 64 of the housing near the collecting chamber 17. Pressure medium is supplied to and drained from the chamber above the piston 62 through a bore 65; while bores 66, 66a and 66b serve the same purpose for the chamber below the piston 62. A bore 67 is also located between the entry points of the bores 65 and 66b into the cylinder chamber with a mouth which is designed as a control edge to cooperate with the piston 62 which thus acts as a slide valve. The cylinder chamber for piston 62 is also defined by a sleeve 68 which carries a pinion 69 on the upper end to mesh with a rack 70 (FIG. 7). Shifting of the rack 70 in the plus or minus direction of arrow 71 causes a rotation of the sleeve 68 and also a rod 72 coupled with sleeve 68 through splining 73. The upper end of the rod 72 supports a stop 74 which interacts with the lower surface of a housing cover 75.

As shown in FIG. 3a, the bottom of the upper part 61b of the dosing and ejecting member 61 forms a seal 76 about the rod 72. The lower end of the lower part 61a forms a valve seat 77 for a valve body 78 which is screwed to a threaded portion 79 on the lower end of the rod 72. The thread pitch is coarse. The valve body 78 is secured against rotation by means of a lug 80 which engages a slot 81 in the member 61. The dosing and ejecting member 61 is likewise secured against rotation by a guide piece 82 screwed into the lower part 61a which interacts with a slot 83 in the housing. A screw 57 closes an opening in the housing required for the insertion of the guide part 82.

The housing part 16a also has an intermediate wall 16c which has a number of bores 84 which communicate with a connection 85 in a further cover 86. The connection 85 connects via a line (not shown) with a source of compressed air, from which air under a pressure of, e.g. 150 kg/cm$^2$ can be conducted into a chamber 87 about the dosing and ejecting member 61. Suitable passages 88 are formed in the member part 61b to communicate the chamber 87 with a chamber 89 inside the part 61b. The compressed air thus pushes the valve body 79 against the valve seat 77. The rod 72 has an extension 90 which acts as a stop for the piston 43.

In the arrangement shown in FIG. 1, the dosing and ejecting member 61 is in a position to deliver the maximum amount of fuel. The fuel quantity for one working cycle is determined by the distance between the ejection end 91 formed by the valve body 78 and the end of the member 61 and the upper edge of the piston 43 when the stop 74 of the rod 72 is in contact with the cover 75.

The control means for actuating the charging apparatus comprises two control sliders 101 and 102 (FIG. 8) operated by cams 103 and 104, respectively. The cams 103, 104 rotate at the engine speed; the cam 103 leading the cam 104 by a lead angle of about 30°. A non-compressible pressure medium such as hydraulic fluid is supplied from a source (not shown) via a line 105 which branches out into two lines 106, 107 which lead to the control slider 101 and to the cylinder chamber for the piston 38 of the slider block 36, respectively. Lines 109, 110 are connected to a relief line 111 which also absorbs leaking fluid collecting in both control sliders above the actual sliders 101a and 102a. A line 112 branches off from the line 106 to the other control slider 102. The pressure medium connection 66 (cf FIG. 1) for shifting or blocking the dosing and ejecting member 61 is connected via a line 113 with the bore 58 in the closing member 35 (cf. FIG. 4). Furthermore, the line 113 is connected, via a line 114, to the relief chamber of the control slider 102 and via a line 115 to the uppermost control slot of slider 102. Through line 116, the bore 45 (cf. FIG. 4) is connected to the pressure medium connection 65 for the down motion of the dosing and ejecting member 61. The center connection on the control slider 102 is connected via a line 117 to the pressure medium bore 47 in the slider block 36 of the closing member 35. On the other slider side, a line 118 extends from the bore 51 to the pressure medium connection 67 for the up motion of the dosing and ejecting member 61.

Figure 8:
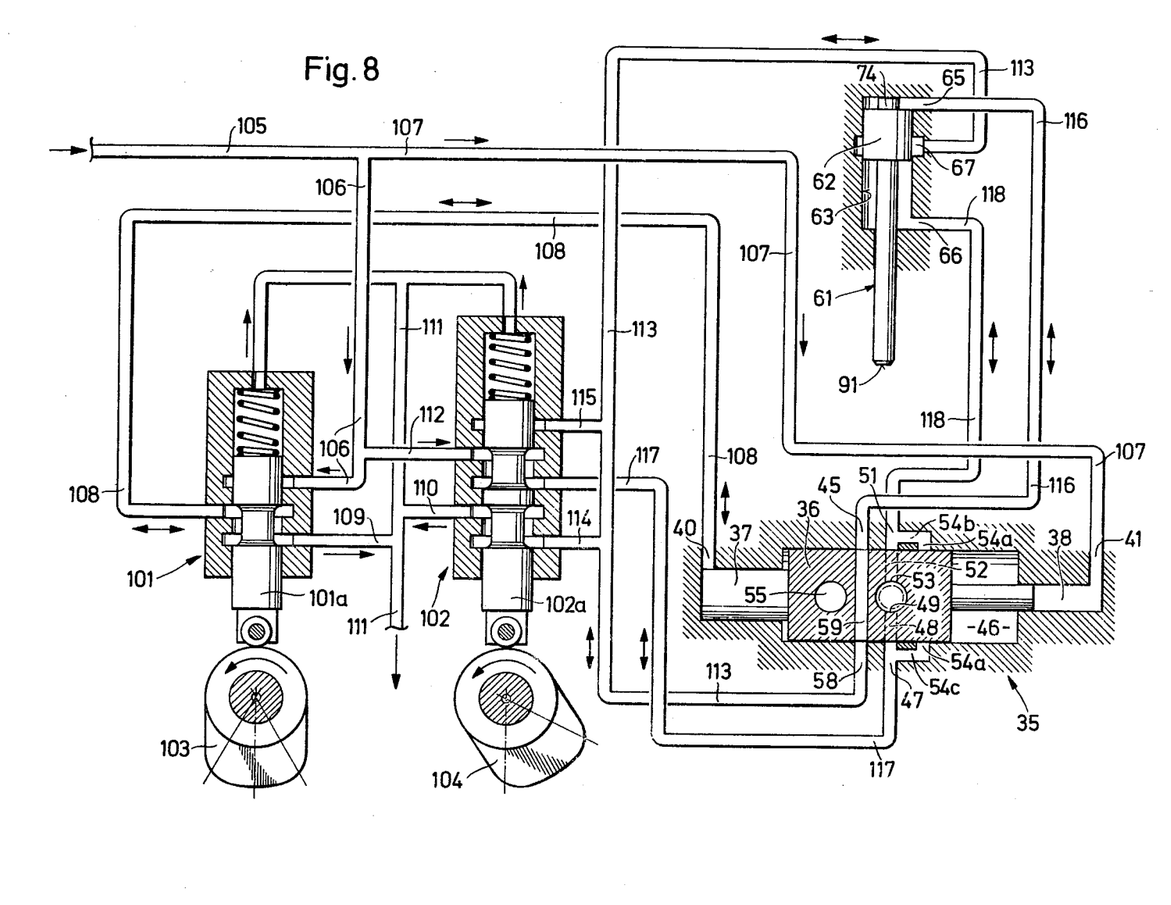
FIG. 8 schematically illustrates a control means according to the invention.
Figure 9:
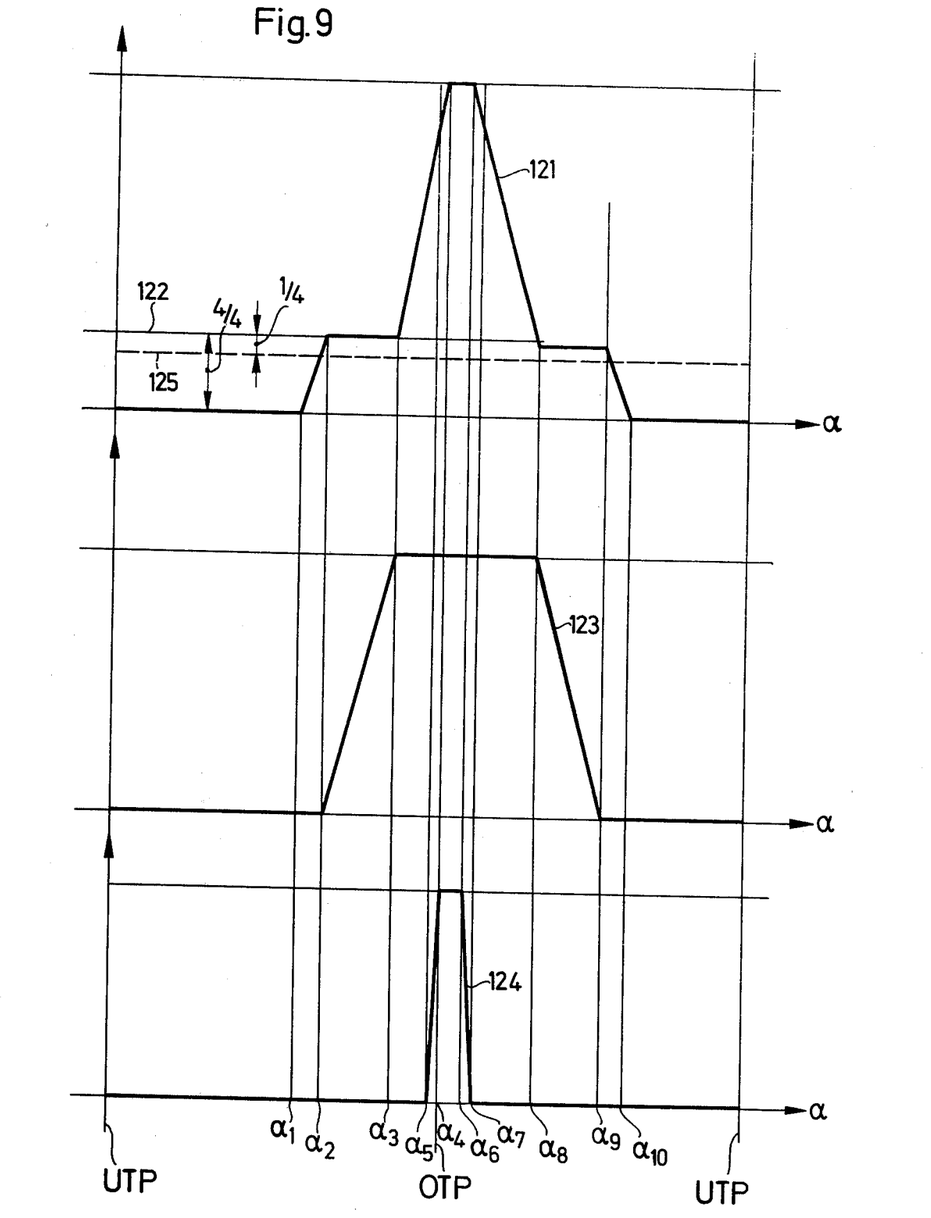
FIG. 9 graphically illustrates the working motions of the controlled parts of the invention as a function of the angular position of the engine crank shaft.

The operating mode of the arrangememt described is as follows:

Assuming that the dosing and ejecting member 61, the closing member 35, and the valve piston 25 are in the position shown in FIG. 1 when the piston 13 of the engine is in the bottom dead center, the cams 103, 104 assume the positions shown in FIG. 8. Line 107 is pressurized, line 108 is relieved so that the slider block 36 is in closing position. Pressure medium can flow through line 117 into the cylinder chamber below the piston 42 and on through line 118 to the underside of piston 62 so that the piston 62 is in a position defined by the the stop 74 of rod 72. When the crank angle $\alpha_1$ is reached (FIG. 9) the slider part 102a of the control slider 102 moves into the up position. This causes line 113 to carry pressure medium while line 117 is being relieved of pressure. Consequently, hydraulic fluid is conducted through line 116 to the upper side of piston 62 and the dosing and ejecting member 61 starts a down motion according to curve 121 in FIG. 9. The stroke continues until crank angle $\alpha_2$ is reached, at which time the slider part 101a of the control slider 101 is shifted into the up position. During the down stroke of the ejection end 91, a partial amount of fuel is ejected downwards into the cylindrical bore 20 while the piston 43 is being lowered into the recess 42. After this dosing stroke, a predetermined fuel quantity is captured in the bore 20.

At the crank angle $\alpha_2$, the piston 43 can close the aperture 49. In this position, the piston 43 is exactly flush with the upper edge of the closing member slider block 36. During this time, the hydraulic fluid discharge through line 118 is blocked and the dosing and ejecting member 61 remains in the position shown in FIG. 2, which corresponds to the stroke 122 in FIG. 9 for full engine load.

Due to the upward motion of the control slider 101a at the crank angle $\alpha_2$, the line 108 has been pressurized at the same time. Because the piston 37 has a larger effective area than piston 38, the slider block 36 of the closing member 35 will move to the right into the other end position. The motion of the closing member slider block 36 is illustrated by curve 123 in FIG. 9 and lasts until the crank angle $\alpha_3$ is reached. As soon as the slider block 36 has assumed the opposite end position, the pressure in line 118 is relieved, and, more specifically, through the bores 51, 54a, 54b, 54c and 47 in the part 39 and via the now shifted bore 59 in the slider block 36, respectively. Due to the fact that the upper edge of the piston 62 at this point in time is located below the upper edge of the control slot in the housing 63 it is possible for the pressure medium from line 113 to move the dosing and ejecting member 61 down into the end position shown in FIG. 3. This end position is reached at the crank angle $\alpha_4$. Before reaching this end position, the lower end of the dosing and ejecting member 61 strikes the sleeve 24 of the valve piston 25 at the crank angle $\alpha_5$ and opens the valve according to curve 124 in FIG. 9. Also, before reaching this end position, the stop 74 on rod 72 makes contact with the bottom 119 of the sleeve 68, thereby blocking the valve body 78 from further motions. This opens the passage for compressed air from the chamber 89 into the transfer channel 21 so that the fuel ejected downward is blown into the combustion chamber 14 through the outlets of the piston valve 25.

Accordingly, the blowing of fuel into the combustion chamber 14 starts at the crank angle $\alpha_5$. According to curve 121 in FIG. 9, the upstroke of the dosing and ejecting member 61 begins at the crank angle $\alpha_6$. Even under full engine load, all the fuel has been transferred into the combustion chamber 14 at this time. Up to the crank angle $\alpha_7$, the valve seat is now being blown free of coal dust residue. In addition, the closing motion of valve piston 25 now begins with the piston 25 becoming completely closed again at crank angle $\alpha_7$. With the upstroke continuing, the valve body 78 shuts the aperture in the ejection end of the dosing and ejecting member 61. From this moment on, the compressed air captured between the valve piston 25 and the ejection end 91 aids the upward motion of the dosing and ejecting member 61 through expansion. This upward motion is initiated by the shifting of the slider part 102a into the lower end position, in which line 118 conducts pressure medium to the underside of the piston 62 whereas line 113 is relieved for discharging pressure medium. This upward motion extends up to a stroke position slightly higher than the intermediate position of the piston 62 during the downstroke. This position is determined by the interaction of the piston 62 as the control slider and the pressure medium connection 66. As the control edge is passed, the discharge of pressure medium through the line 113 is blocked. Since the line 116 thus prevents a return flow of pressure medium in the right end position of slider 36, the dosing and ejecting member 61 stops when the crank angle $\alpha_8$ is reached.

At this point in time, the slider 101a is lowered. This causes the line 108 to be relieved. Under the pressure constantly acting upon the piston 38, the slider block 36 is shifted again into the left end position which is reached at the crank angle $\alpha_9$. Upon the attainment of this end position, the piston 43 can penetrate the bore 20 until abutting the stop 90 located slightly higher. In this position, the line 116 is relieved again via the bore 59 in the slider block 36 so that the pressure medium supply from line 118 is able to return the dosing and ejecting member 61 into the upper starting position. This position is reached at the crank angle $\alpha_{10}$. This is possible because the lower edge of the piston 43 has freed the passage of pressure medium from bore 58 to bore 52 due to the short upward motion of the piston 43 as the slider block 36 moves into the end position shown.

In the manner already described, the dosing stroke taking place between the crank positions $\alpha_1$ and $\alpha_2$ can be shortened in that manipulation of the rack 70 (FIG. 7) in the minus direction of arrow 71 adjusts the starting position of the ejection end 91 of the dosing and ejecting member 61 downward. The stroke for $\frac{1}{4}$ load then corresponds to the distance between line 125 and line 122.

The internal-combustion engine according to the invention makes possible the exact dosing of fuel in powder form without the danger of lumping during the fuel transfer into the combustion chamber. No pressure at all is exerted on the dosed partial fuel quantity during the motion of the dosing and ejecting member 61 and of the piston 43; the fuel packet is sheared out of the fuel supply in the collecting chamber 17. After the transfer of the closing member 35 into the open position, the dosing and ejection member 61 pushes the fuel freely along in front. The fuel transfer into the combustion chamber 14 is promoted by the compressed air flowing into the transfer channel 20, 21 as the valve body 78 lifts off the seat 77. In addition, this compressed air causes the valve seat for the valve piston 25 to be blown clean so that a good seal is assured when the valve piston 25 is in the closed position.

Beyond this, the volume to be compressed in the transfer channel 21 by the compressed air remains limited to a minimum, thereby reducing the compression work required. The fact that the air volumes in the chambers 89 and 87 remain unchanged during the stroke movement of the dosing and ejecting member 61 serves the same purpose.

The invention is not restricted to the embodiment examples described as other control means are also conceivable, as well as other means for varying the fuel dosing.

What is claimed is:

1. In a reciprocating internal combustion engine for operation with fuel in powder form, the combination comprising
   an engine cylinder head having a combustion chamber and a piston movably mounted in said combustion chamber;
   a valve piston slidably mounted in said cylinder head for movement into and out of said combustion chamber, said valve piston having outlets therein for expelling fuel into said combustion chamber;
   a housing mounted on said cylinder head;
   a fuel collecting chamber in said housing;
   a fuel transfer channel communicating said fuel collecting chamber with said valve piston to deliver fuel into said valve piston;
   a closing means disposed intermediately of said fuel transfer channel, said means including a slider block movably transversely of said transfer channel and having a passage therein for selective alignment in said fuel transfer channel, a recess for selective alignment with said fuel transfer channel, a piston movably mounted in said recess, and spring means for biasing said latter piston out of said recess towards said fuel collecting chamber;
   a dosing and ejecting member aligned with said transfer channel for expelling a charge of fuel from said fuel collecting chamber through said slider block passage and said transfer channel into said valve piston;
   adjusting means for adjusting the position of said dosing and ejecting member relative to said piston in said slider block to vary the charge of fuel therebetween; and
   control means for cyclically moving said dosing and ejecting member, said slider block and said valve piston in timed sequence to eject a charge of fuel into said combustion chamber.

2. The combination as set forth in claim 1 wherein said dosing and ejecting member is aligned with said valve piston and is movable with a supply stroke to abut and move said valve piston into said combustion chamber during a latter part of said supply stroke.

3. The combination as set forth in claim 1 wherein said housing includes an air chamber for receiving a compressed air and said dosing and ejecting member includes an elongated tube slidably mounted in said housing, said tube having an aperture at one end and a port communicating the interior thereof with said air chamber to receive compressed air therein, and which further comprises a valve body mounted in said tube whereby in a first closed position of said dosing and ejecting member said valve body seats on said tube to close said aperture and in a second open position of said dosing and ejecting member said tube is moved relative to said valve body to open said aperture to a flow of compressed air therethrough.

4. The combination as set forth in claim 3 wherein in said first closed position, compressed air in said tube presses said valve body against a seating surface in said tube about said aperture.

5. The combination as set forth in claim 3 wherein said dosing and ejecting member further includes a piston at an opposite end and said tube is mounted for sliding into and out of said transfer channel.

6. The combination as set forth in claim 3 which further comprises a rod secured to said valve body and concentrically disposed in said tube for relative axial movement, and a stop in said housing for arresting motion of said rod relative to said tube to permit opening of said tube aperture.

7. The combination as set forth in claim 6 wherein said valve body is threaded onto said rod and is splined to said tube and wherein said adjusting means includes a rotatable sleeve in said housing between said rod and said tube, said sleeve being splined to said rod to rotate said rod therewith relative to said valve body, said sleeve having said stop secured thereon.

8. The combination as set forth in claim 1 wherein said dosing and ejecting means includes a strip pin projecting towards said piston in said slider to abut and push said latter piston into said slider recess upon movement of said dosing and ejecting member towards said transfer channel.

9. The combination as set forth in claim 1 which further comprises a blocking means for arresting motion of said dosing and ejecting member towards said transfer channel in an intermediate position in which said piston in said slider is fully received in said recess whereby said slider is free to move transversely of said transfer channel.

10. The combination as set forth in claim 9 wherein said housing has a chamber about said dosing and ejecting member for receiving air and said control means blocks delivery of air to said chamber during downward motion of said member.

11. The combination as set forth in claim 10 wherein said member is tubular and has passages communicating said chamber with a chamber inside said member, said passages being closed upon movement of said member into said open position.

12. The combination as set forth in claim 1 wherein said member has a piston at an upper end and said housing has a pressure medium connection defining a control edge, said member being movable during an upward stroke into an intermediate position to block said connection and stop further upward movement of said member while allowing movement of said slider block.

13. The combination as set forth in claim 12 wherein said housing has a discharge bore for discharging pressure medium during the upward movement of said member and said slider block prevents a discharge of pressure medium from said chamber above said piston in said intermediate position.

14. The combination as set forth in claim 13 wherein said housing has a bore for supplying pressure medium under said piston during the upward movement of said member, said control edge being disposed between said bores.

* * * * *

UNITED STATES PATENT AND TRADEMARK OFFICE
CERTIFICATE OF CORRECTION

PATENT NO. : 4,059,077
DATED : November 22, 1977
INVENTOR(S) : Anton Steiger

It is certified that error appears in the above-identified patent and that said Letters Patent are hereby corrected as shown below:

Column 4, line 4, change "slier" to --slider--

Column 4, line 38, change "the" to --The--

Column 5, line 63, after "by" delete first --the--

Signed and Sealed this

Twenty-first Day of November 1978

[SEAL]

Attest:

RUTH C. MASON
Attesting Officer

DONALD W. BANNER
Commissioner of Patents and Trademarks